United States Patent

Speiser

[11] 3,890,618
[45] June 17, 1975

[54] BESSEL SEQUENCE ECHO-LOCATION SYSTEM

[75] Inventor: Jeffrey M. Speiser, San Diego, Calif.

[73] Assignee: The United States of America as represented by the Secretary of the Navy, Washington, D.C.

[22] Filed: Aug. 30, 1973

[21] Appl. No.: 393,259

[52] U.S. Cl............ 343/17.1 R; 235/197; 340/3 R; 340/15.5 TA; 343/100 CL
[51] Int. Cl....... G01s 7/28; G06f 15/34; G06g 7/26
[58] Field of Search ... 343/6.5 LC, 17.1 R, 100 CL; 235/197; 333/30 R; 340/15.5 TA, 3 R

[56] References Cited
UNITED STATES PATENTS

| | | | |
|---|---|---|---|
| 2,532,221 | 11/1950 | Bradley | 343/17.1 PF |
| 3,112,481 | 11/1963 | Goldberg | 343/14 |
| 3,249,940 | 5/1966 | Erickson | 343/100 CL |
| 3,339,198 | 8/1967 | Glegg | 343/17.1 R X |
| 3,636,562 | 1/1972 | Wehner | 343/17.1 R X |
| 3,665,171 | 5/1972 | Morrow | 235/197 X |
| 3,686,669 | 8/1972 | Toulis | 343/17.1 R X |
| 3,755,761 | 8/1973 | Hartmann | 333/30 R |
| 3,778,821 | 12/1973 | Young | 343/5 R |
| 3,789,398 | 1/1974 | Erst | 343/14 |

Primary Examiner—Malcolm F. Hubler
Attorney, Agent, or Firm—Richard S. Sciascia; Ervin F. Johnston; John Stan

[57] ABSTRACT

A transmitter for use in an echo-location system for radar or sonar, comprising a source of signals consisting of a sequence of weighted pulses conforming to the equation $$\sum_{n=-N}^{N} J_n(x) p(t-nT),$$

where $J_n(x)$ denotes the $n$th Bessel function of the first kind, $p(t)$ is the time function corresponding to an elementary pulse, and $T$ is the spacing between elementary pulses. In a specific implementation of the transmitter, the source of signals comprised $J_-$ source of signals $\delta(t)$; a delay line connected to the impulse signal source $\delta(t)$; a plurality of $(2N+1)$ weighted taps connected to the delay line, in which the tap weightings from the input to the output of the delay line are $J_{-N}(x), \ldots, J_0(x), \ldots J_N(x)$: and a signal summer connected to the outputs of the plurality of weighted taps, the output of the summer having the desired waveform for the signal to be transmitted, namely $$\sum_{n=-N}^{N} J_n(x) p(t-nT).$$

A receiver which may be used with the specific transmitter of the echo-location system comprises similar components, with the tap weightings from the input to the output of the receiver delay line are $J_N(x), \ldots, J_0(x), \ldots, J_{-N}(x)$, the reverse of the transmitter signal weightings.

11 Claims, 4 Drawing Figures

BESSEL SEQUENCE ECHO-LOCATION SYSTEM-TRANSVERSAL FILTER IMPLEMENTATION

GENERAL MATCHED-FILTER ECHO-LOCATION SYSTEM.

BESSEL SEQUENCE ECHO-LOCATION SYSTEM-GENERAL IMPLEMENTATION.

BESSEL SEQUENCE ECHO-LOCATION SYSTEM-TRANSVERSAL FILTER IMPLEMENTATION.

BESSEL SEQUENCE FILTER IMPLEMENTED AT BANDPASS.

BESSEL SEQUENCE ECHO-LOCATION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The choice of signal used in an echo-location system determines the resolution and ambiguity in scatterer mapping provided by the system, as well as determining the complexity required for a successful implementation of the system.

If a distribution of scatterers extended in range is to be mapped using a matched filter receiver, then the resolution and ambiguity in the mapping are controlled by the width and sidelobe level of the signal's autocorrelation function. The critical part of the transmitter is a means of generating the desired signal, and the critical part of the receiver is a filter matched to the transmitted signal. For signals of moderate complexity, both functions are generally performed by a transversal filter when a high quality implementation is desired.

A representative signal of this type is a chirp — a linear or nonlinear FM pulse. For this special signal, the matched filter may also be realized as a dispersive delay line. The chirp is widely used for echo-location because chirps of different time-bandwidth products, and consequently different pulse-compression factors, may be generated by similar means.

Two major problems are encountered in the design and construction of a chirp echo-location system.

A chirp waveform truncated to have finite duration does not have the ideal autocorrelation function of the infinite-duration chirp. Unless a suitable apodization factor is chosen, the resulting autocorrelation function has large sidelobes and is poorly suited to the separation of a number of scatterers. A more serious problem is the difficulty of implementing a matched filter for a chirp of large time-bandwidth product. It is difficult to precisely control the dispersion in a dispersive delay line. If, on the other hand, a transversal filter implementation is chosen, then it is necessary to use a non-uniform tap spacing, which also makes the fabrication difficult.

This invention relates to a transmitter and receiver filter network suitable for use in an echo-location system, for providing a high-resolution mapping of a distribution of scatterers, and capable of being implemented by simply using transversal filter technology. With a suitable choice of parameters and external transducers, the system may be used as a radar, sonar, or geophysical exploration system.

In order to achieve a high-resolution echo-location system, it is desirable to generate a signal which has an impulse for its autocorrelation function. This problem may be solved by noting that a matched filter should be a transversal filter whose tap weights $J_{-N}(x), J_{-N+1}(x), \ldots J_{-1}(x), J_0(x), \ldots J_N(x)$ satisfy the conditions. The approximation is excellent when $N$ is greater than about $1.5x$ to $2x$.

In the prior art, a sinusoidal signal of continuously varying frequency, or a sinusoid of varying period have been used. These are called chirps.

It has been determined that sample functions derived from Bessel functions are particularly useful. These then give ideal correlation functions which are identically zero, except for the zero shift point.

In the signal of this invention, the side lobes are arbitrarily small.

In the prior art, a chirp would be generated, and then modulated so as to change the envelope, with the object of reducing the amplitude of the side lobes of the chirp.

In this invention, a solution to the problem has been found in that a signal has been found wherein the side lobes are of substantially zero amplitude, and therefore no cancellation is necessary.

SUMMARY OF THE INVENTION

In its broadest form the invention relates to a transmitter for use in an echo-location system for radar or sonar, using a source of signals comprising a sequence of weighted pulses conforming to the equation $$\sum_{n=-N}^{N} J_n(x) p(t-nT),$$

where $J_n(x)$ denotes the $n$th Bessel function of the first kind, $p(t)$ is the time function corresponding to an elementary pulse, and $T$ is the spacing between elementary pulses.

In a specific implementation of the transmitter, the source of signals comprised: a source of signals $\delta(t)$; a delay line connected to the impulse signal source $\delta(t)$; a plurality of $(2N+1)$ weighted taps connected to the delay line, in which the tap weightings from the input to the output of the delay line are $J_{-N}(x), \ldots, J_0(x), \ldots J_N(x)$; and a signal summer connected to the outputs of the plurality of weighted taps, the output of the summer having the desired waveform for the signal to be transmitted, namely $$\sum_{n=-N}^{N} J_n(x) p(t-nT).$$

A receiver which may be used with the transmitter of the echo-location system comprises similar components.

OBJECTS OF THE INVENTION

An object of the invention is to provide a transversal filter network which is simple to implement, since the tap spacing required is uniform.

Another object of the invention is to provide a transversal filter network which requires no signal apodization other than a simple truncation.

Yet another object of the invention is to provide a transversal filter network for which the range side lobes are very small, resulting in excellent range resolution and capability of separation of close scatterers.

Other objects advantages and novel features of the invention will become apparent from the following detailed description of the invention, when considered in conjunction with the accompanying drawings, wherein:

DESCRIPTION OF THE PREFERRED EMBODIMENTS

Figure 1:
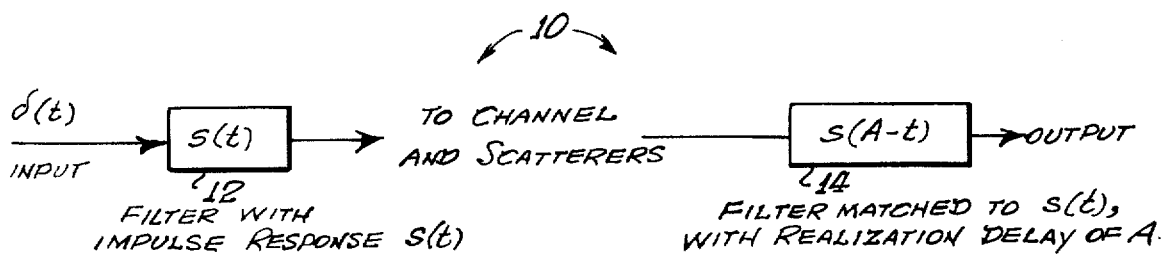
FIG. 1 is a block diagram of a prior art general matched-filter echo-location system.

Before discussing the embodiments of this invention, a brief discussion of the matched-filter echo-location system 10 of FIG. 1 should prove useful. For some values of $s(t)$, and, consequently, of $s(A-t)$, receiver filter 12 and transmitter filter 14 have already been designed. This invention concerns itself with specific values of $s(t)$ and $s(A-t)$.

The embodiment 10 shown in FIG. 1, as indicated by the title, is not novel generally. However, with the specific values of the impulse response $s(t)$, as described hereinbelow, the implementation 10 is novel. In fact, it is a generalization of the embodiment 20 shown in FIG. 2.

The restriction on the impulse response $s(t)$ is that it be a type of Bessel sequence, that is, that it be a sequence of pulses, each of which has an amplitude proportional to the Bessel sequence. With this restriction, FIG. 1 relates to a novel embodiment 10 of this invention.

There is another possible description of signals emanating from the equation for $$s(t) = \sum_{n=-N}^{N} J_n(x) p(t-nT).$$

Part of the function, $p(t-nT)$, may be considered to be a low-pass function, which makes the overall signal low-pass. The overall signal may then be multiplied by a cosine term and transmitted at band pass.

There is still another interpretation. The function $p(t-nT)$ may be made a sinusoidal pulse train, a packet of finite duration, for example a packet of 10 sine wave cycles. Then, considering the equation $$\sum_{n=-N}^{N} J_n(x) p(t-nT),$$

the signal is a sum or sinusoidal packets, which again makes it a band-pass signal. In effect, there are a series of pulses with a sinusoidal envelope for each packet. The overall envelope of the whole sequence is a Bessel sequence.

Discussing qualitatively the mathematical background of the invention, a Bessel function is a function of two variables, an argument and an index. Normally, the variable of interest is the argument. An arbitrary function may be expanded as a sum of Bessel functions of different indices, where the variable of concern is the argument.

However, the sequences of interest in this invention are different from the conventional Bessel type sequences in that all terms in the sequence are functions of only one argument, designated n herein, the index being the variable.

There are some similarities that the signals generated by the apparatus of this invention have to chirp signals. Both have sharp autocorrelation functions, hence they are excellent echo-location signals. However, a chirp signal, as generally applied, required amplitude shading. A chirp of infinite length has a perfect autocorrelation function, however, since in any physical realization the length has to be truncated, then amplitude shading is required.

The Bessel sequence of this invention also has a perfect autocorrelation function. Generally, truncation is not required since its effects are negligible. Moreover, the amount of truncation desired can be easily determined. If the argument is small, the zero index term is large and terms involving other indices are very small comparatively. As the argument increases, the number of significant terms increases almost linearly with the argument. Once the argument becomes larger than about 2, or 3, the number of terms required for satisfactory correlation equals approximately 1.5 times the argument.

Beyond the critical number proportional to the argument, the terms get small very rapidly, decaying faster than exponentially. The effect of throwing away terms, that is, of truncating terms, is negligible. In some numerical calculations performed, the amplitude of the largest term was set at 10,000 and any terms less than one were rejected. This resulted in side lobes in the autocorrelation function that were reduced 80db from the main lobe. In practice it is very difficult to realize an implementation where the side lobes are reduced more than 40db.

Figure 2:
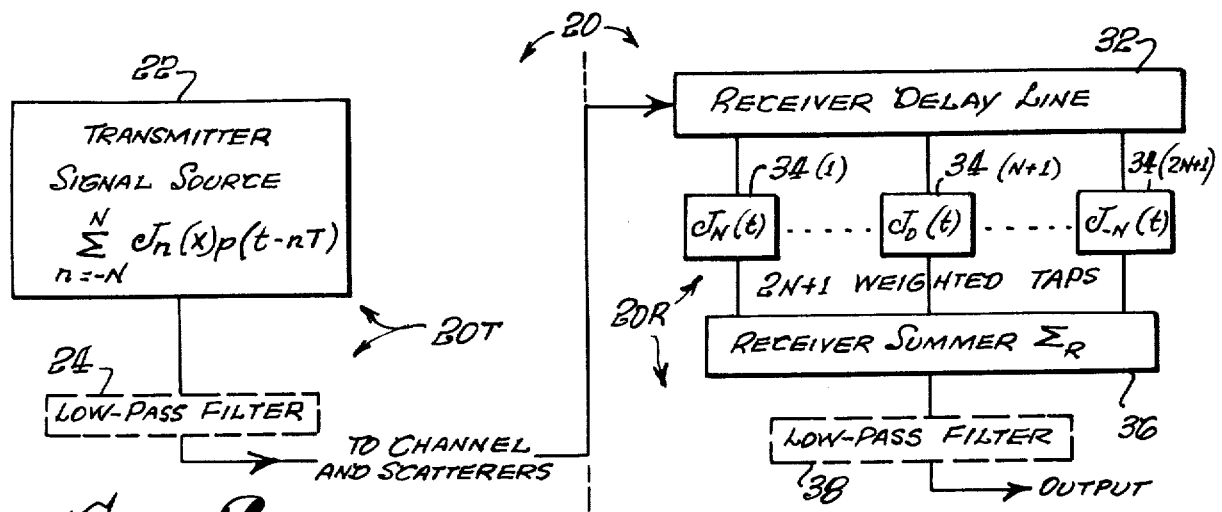
FIG. 2 is a block diagram of the Bessel sequence echo-location system of this invention, with a transversal filter implementation for the receiver only.

Referring now to FIG. 2, in its very broadest form, the invention comprises a transmitter 20T for use in an echo-location system 20 for radar or sonar comprising a source of signals 22 comprising a sequence of weighted pulses conforming to the equation $$\sum_{n=-N}^{N} J_n(x) p(t-nT),$$

where $J_n(x)$ denotes the nth Bessel function of the first kind, $p(t)$ is the time function corresponding to an elementary pulse, and $T$ is the spacing between elementary pulses.

In none of the figures are some of the conventional circuits, such as intermediate and final amplifiers and power supply, used in a transmitter, shown, it being understood that a person skilled in the art would known how to arrange all essential components.

In FIG. 2 is also shown a receiver 20R to be used with the transmitter 20T of the echo-location system 20, comprising a delay line 32, for receiving the transmitted Bessel sequence signal. A plurality of $(2N + 1)$ weighted taps, 34(1) through 34(2N+1) are connected to the receiver delay line 32. The tap weightings from the input to the output of the receiver delay line 32 are $J_N(x), \ldots J_0(x), \ldots, J_{-N}(x)$, the reverse of the transmitter 20T signal weightings. A signal summer 36 is connected to the outputs of the plurality of receiver weighted taps, 34(1) through 34(2N+1).

In the echo-location system 20 shown in FIG. 2, the transmitter 20T may further comprise a low-pass filter 24, whose input is connected to the output of the source of signals 22. The receiver 20R may also further comprise a low-pass filter 38, whose input is connected to the output of the receiver signal summer 36.

There are alternative embodiments to that shown in FIG. 2 which will work. Once the type of signal which is required is known, it can readily be determined how to implement other versions of the invention.

The key to the invention is in the signal selection. The specific signal selected would depend on the specific application. The signal selected is of the form $$s(t) = \sum_{n=-N}^{N} J_n(x) p(t-nT),$$

where $T$ is the spacing between elementary pulses, $p(t)$ is the time function corresponding to an elementary pulse, and $J_n$ denotes the $n$th Bessel function of the first kind.

The elementary pulse, or interpolating pulse $p(t)$, determines the bandwidth of the signal to be transmitted. The value of the parameter $x$, together with the spacing $T$ between pulses, determines the duration of the transmitted signal. If the interpolating pulse has a low time-bandwidth product, and the spacing between pulses is comparable to the width of the interpolating pulse, then the time-bandwidth product of the transmitted signal is proportional to the value of the parameter $x$. The parameter $N$ will generally be chosen so that $J_n(x)$ is small for $n > N$.

The autocorrelation function of the transmitted signal is very close to (exact for $N = \infty$) the autocorrelation function of the interpolating pulse $p(t)$, even though the duration of the former may be many times greater.

Stated differently, the delay between taps may be long compared to the duration of an interpolating pulse. Or, the total duration of the filter impulse response may be long compared to the duration of the interpolating pulse.

Since the Bessel functions are small when the order is large compared to the argument, no further apodization is required.

The preferred embodiment of the receiver's matched filter is a transversal filter with tap weights $J_N(x)$, $J_{N-1}(x), \ldots J_0(x), J_{-1}(x), \ldots J_{-N}(x)$. As described hereinabove the transmitted signal may be generated by use of a similar filter or by indirect means.

The interpolating pulse may be automatically provided by the impulse response of the type of tap used in the transversal filter, or may be realized as a simple low-pass filter following the transversal filter. This realization may be done in a variety of ways. The simplest way is as shown in FIGS. 2 and 3.

Figure 3:
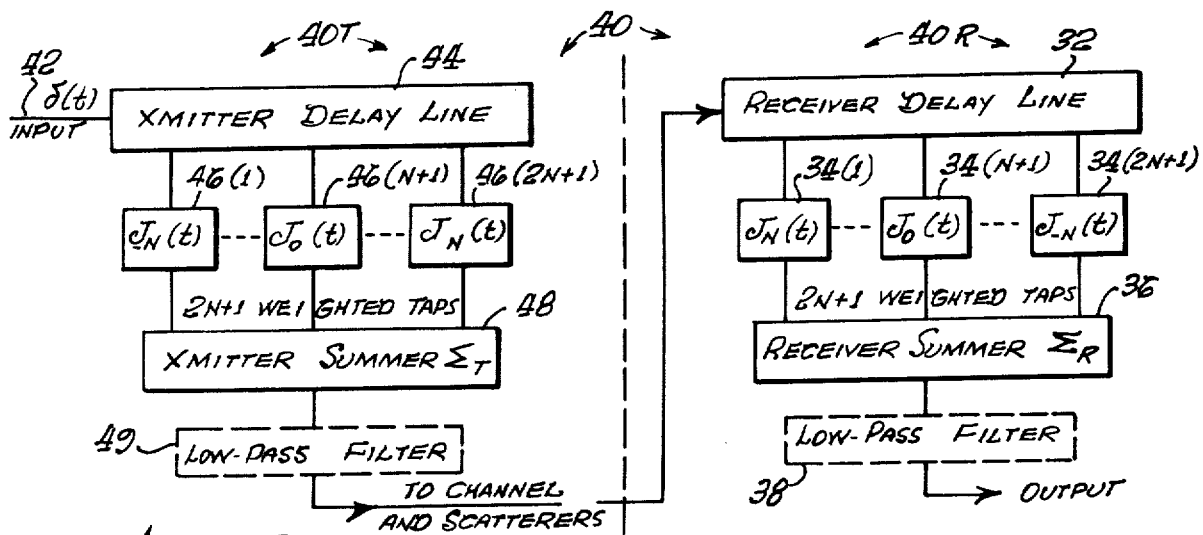
FIG. 3 is a block diagram of the Bessel sequence echo-location system of this invention, with a transversal filter implementation for both the transmitter and receiver.

In FIG. 3 a low-pass filter may be inserted before the transmitter summer 48 or in FIG. 2 also, before the receiver summer 36, but then there would have to be a low-pass filter in each tap arm. So, generally, the low-pass filter, 49 or 38, is inserted after the summers 48 or 36, as shown by the dotted blocks in this figure.

Figure 4:
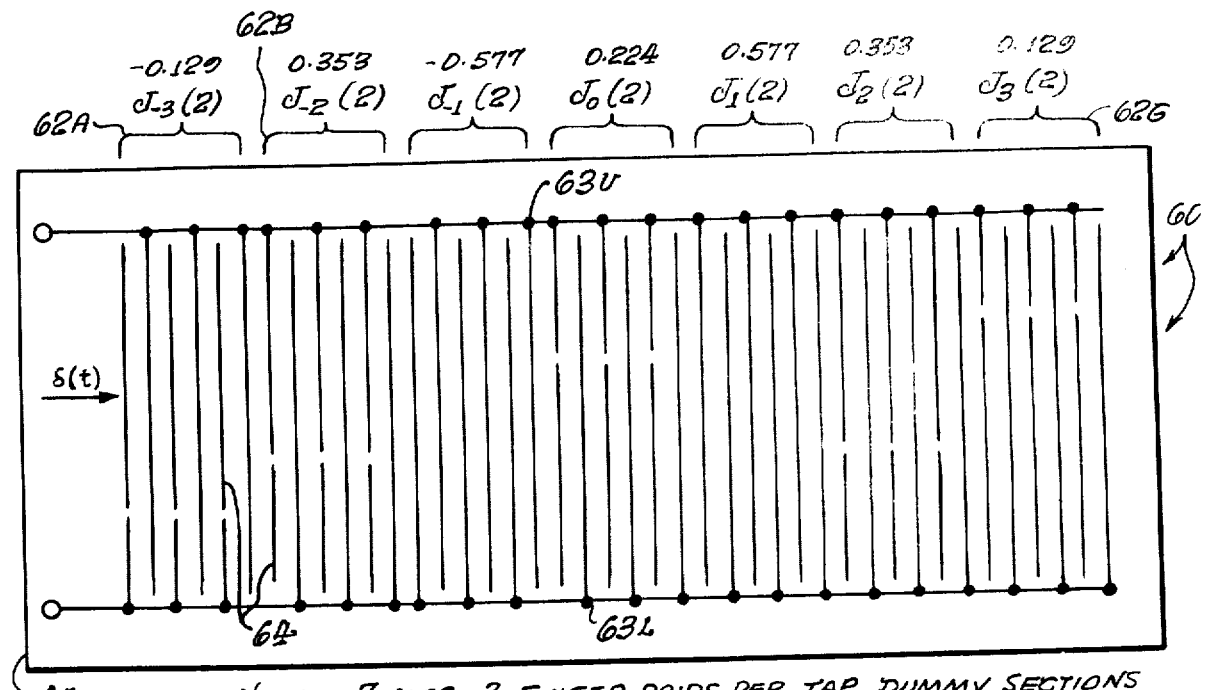
FIG. 4 is a diagrammatic view of a Bessel sequence filter implemented at band pass.

In some implementations, for example using surface-wave transducers, as shown in FIG. 4, the summer is a very simple device, for example, a bus bar. In such an embodiment, the output of the surface-wave device 60 is fed to a low-pass filter (not shown).

Discussing further the mathematical theory behind the invention, the pulse-compression properties of the signal are due to the Bessel function identity.

$$\sum_{n} J_n(x) J_{n+k}(x) = \begin{Bmatrix} 1, & k=0 \\ 0, & k\ne 0 \end{Bmatrix}$$

The above identity has the following significance in the theory of this invention. Assume an ideal delay line where the taps have infinite bandwidth. What the equation states is that the matched filter response with $\delta(t)$ input will result in a $\delta(t)$ output. This would depend upon the tap weightings and the tap spacing being the same in the transmitter as in the receiver. Referring back to FIG. 3 it assumes that $N$ is very large, which implies that all significant terms in the Bessel sequence are used.

The identity equation assumes a summation over an infinite number of terms $n$, and is exact. Once the series is truncated, the equation is not exact. If the truncation is not too short, then the autocorrelation function is still a good approximation to the autocorrelation function when using the whole series. Using some truncated series, the side lobes were reduced by 80db, which is so small that the slightest imperfection will outweigh the variation due to the truncation.

Discussing another point, the equation $$\sum_{n=-N}^{N} J_n(x) p(t-nT),$$

some of the terms of the sequence may be negative, but for many types of implementations this does not create any special problems. For example, for interdigitated transducers, a weighting may be made negative by merely reversing the connection of two adjacent fingers to two opposite bus bars, as is shown in FIG. 4. In another type of embodiment, transformer windings may be reversed to obtain a negative term.

When truncation for the equation for $s(t)$ is used, the summation need not be symmetrical with respect to $n$, but may extend from $n = -N_1$ to $n = N_2$. Generally, the truncation is sufficient when $N_1, N_2 > 1.5x$.

In FIG. 3 a more specialized embodiment of a transmitter 40T used in an echo-location system 40 is shown. The transmitter 40T source of signals may comprise an impulse signal source $\delta(t)$, labelled 42. A delay line 44 is connected to the impulse signal source $\delta(t)$ 42. A plurality of $(2N + 1)$ weighted taps, 46(1) through 46(2N + 1), are connected to the delay line 44. The tap weightings from the input to the output of the delay line are $J_{-N}(x), \ldots J_0(x), \ldots J_{+N}(x)$. A signal summer 48 is connected to the outputs of the plurality of weighted taps, the output of the summer having the desired waveform from the signal to be transmitted, namely $$\sum_{n=-N}^{N} J_n(x) p(t-nT).$$

The receiver 40R shown in FIG. 3 is identical to the receiver 20R shown in FIG. 2.

The transmitter need not be implemented as a filter, as shown in FIG. 3. It may be a recursive Bessel signal generator, such as is described in the U.S. application Ser. No. 393,685, filed Aug. 31, 1973 now U.S. Pat. No. 3,800,876, entitled APPARATUS FOR THE GENERATION OF BESSEL FUNCTION SIGNALS, filed by George W. Byram. The transmitter either requires a filter with a given impulse response, or some means of generating a Bessel sequence. The transmitter signal is a characteristic feature of the invention. The hardware per se may not be new, but the particular coding on the hardware is new. The specific tappings shown in FIG. 3 indicate one way in which the desired signal may be transmitted.

The signal source may be replaced by another means of generating the Bessel sequence. A sequence of pulses could be prerecorded on a tape recorder, amplified, and then transmitted. The Bessel sequence recursive generator described in the aforementioned application by George W. Byram could be used to generate the transmitter signal. Any means of recording and playback, which could comprise a tape recorder, a digital shift register memory, or an analog circulating delay line memory, could be used for generating the transmitter signal.

In the transmitter 40T of FIG. 3, the delay line 44, the weighted taps, 46(1) through 46(2N + 1), and the signal summer 48 may comprise an interdigitated acoustic surface wave device. One such useful surface wave device 60 is shown in FIG. 4. The transducer 60 has the tap weightings comprising of groups, 62A through 62G, of finger pairs, each pair in a specific group having the same weighting. The transmitter, 40T of FIG. 3, thereby being a band-pass transmitter.

In the transducer 60 of FIG. 4, the overlap region of each group of fingers is proportional to the $J_n$'s. Each group of taps is uniform. Assume a series $J_N$ to $J_{-N}$. There are then (2N + 1) groups. Each of the groups consist of a certain number of fingers. Within each group the transducer appears to be a uniformly coded transducer, that is, an uncoded transducer, except that from group to group the amount of finger overlap varies.

A reasonable truncation, shown in FIG. 4, in the case of $J_n(2)$ is N=3, i.e., use $J_{-3}(2), J_{-2}(2), J_{-1}(2), J_0(2), J_1(2), J_2(2)$ and $J_3(2)$.

For a surface wave transversal filter, the tap weight is determined by the finger overlap length, as is well known.

The dots 63U and 63L are shown only to emphasize the connection point locations at the bus. In an actual implementation, the dots would not appear on the metallization.

A design example of a Bessel sequence filter implemented at bandpass is given on the two tables below To keep the tap configuration easy to draw, a small value is used for the Bessel sequence argument, i.e., $x = 2$.

| P | $J_p(2)$ | P | $J_p(2)$ |
|---|---|---|---|
| 0 | 0.224 | −1 | −0.577 |
| 1 | 0.577 | −2 | 0.353 |
| 2 | 0.353 | −3 | −0.129 |
| 3 | 0.124 | −4 | 0.034 |
| 4 | 0.034 | −5 | −0.007 |
| 5 | 0.007 | | |

The values for positive values of $p$ are obtained from a standard mathematical handbook. The negative index points are obtained by using the identity $J_{-p}(x) = (-1)^p J_p(x)$.

A close observation of FIG. 4 will reveal that some of the fingers of the finger pairs have segments 64 which do not contribute to the weighting, but are nevertheless left on the substrate 66 upon which all fingers are disposed.

Varying the length of the transducer fingers alone has disadvantages. Instead the interdigitated fingers have fingers of equal length, but where a finger of maximum length is not required the finger is cut transversely so that every finger has the same length of metal associated with it.

The reason for this is to have a uniform acoustic path across the whole length of the transducer. In effect, the cross-section of the transducer as "seen" by the acoustic wave is uniform. Otherwise wave front curvature is present, as in an optical lens. It is desired that the wave front be flat as it propagates through the transducer.

The technique of slitting the individual fingers is old in the art.

The receiver 20R and 40R could have interdigitations similar to those in the embodiment 60 shown in FIG. 4, except that the sequences of the $J_n$ would be in reverse order to that shown in FIG. 4. This would make the receiver 20R or 40R a band-pass receiver.

Obviously many modifications and variations of the present invention are possible in the light of the above teachings. It is therefore to be understood that within the scope of the appended claims the invention may be practiced otherwise than as specifically described.

What is claimed is:

1. A transmitter for use in an echo-location system for radar or sonar, comprising:
   a source of signals comprising a sequence of weighted pulses conforming to the equation $$\sum_{n=-N}^{N} J_n(x)p(t-nT),$$

where $J_n(x)$ denotes the $n$th Bessel function of the first kind, $p(t)$ is the time function corresponding to an elementary pulse, and $T$ is the spacing between elementary pulses.

2. The transmitter according to claim 1, wherein the source of signals comprises:
   a source of signals $\delta(t)$;
   a delay line connected to the impulse signal source $\delta(t)$;
   a plurality of (2N + 1) weighted taps connected to the delay line, in which the tap weightings from the input to the output of the delay line are $J_{-N}(x), \ldots, J_0(x), \ldots J_{+N}(x)$; and
   a signal summer connected to the outputs of the plurality of weighted taps, the output of the summer having the desired waveform for the signal to be transmitted, namely $$\sum_{n=-N}^{N} J_n(x)p(t-nT).$$

3. A receiver to be used with the transmitter of the echo-location system according to claim 1, comprising:
   a delay line, for receiving the transmitted Bessel sequence signal;
   a plurality of (2N + 1) weighted taps connected to the receiver delay line, in which the tap weightings from the input to the output of the receiver delay line are $J_{-N}(x), \ldots, J_0(x), \ldots, J_{+N}(x)$, the reverse of the transmitter signal weightings; and
   a signal summer connected to the outputs of the plurality of receiver weighted taps.

4. An echo-location system according to claim 3, wherein the transmitter further comprises:

a low-pass filter, whose input is connected to the output of the source of signals; and wherein the receiver further comprises:

a low-pass filter, whose input is connected to the output of the receiver signal summer.

5. A receiver to be used with the transmitter of the echo-location system according to claim 2, comprising:

a delay line, for receiving the transmitted Bessel sequence signal;

a plurality of $(2N + 1)$ weighted taps connected to the receiver delay line, in which the tap weightings from the input to the output of the receiver delay line are $J_{+N}(x), \ldots, J_0(x), \ldots, J_{+N}(x)$, the reverse of the transmitter signal weightings; and a signal summer connected to the outputs of the plurality of receiver weighted taps.

6. An echo-location system according to claim 5, wherein the transmitter further comprises:

a low-pass filter, whose input is connected to the output of the source of signals; and wherein the receiver further comprises:

a low-pass filter, whose input is connected to the output of the receiver signal summer.

7. The transmitter according to claim 2, wherein the delay line, the weighted taps and the signal summer comprise an interdigitated acoustic surface wave device.

8. The transmitter according to claim 7, wherein the tap weightings comprise groups of finger pairs, each pair in a specific group having the same weighting;

the transmitter thereby being a band-pass transmitter.

9. A receiver to be used with the transmitter of the echo-location system according to claim 8, comprising:

a delay line, for receiving the transmitted Bessel sequence signal;

a plurality of $(2N + 1)$ weighted taps connected to the receiver delay line, in which the tap weightings from the input to the output of the receiver delay line are $J_{+N}(x), \ldots, J_0(x), \ldots J_{-N}(x)$, the reverse of the transmitter signal weightings; and a signal summer connected to the outputs of the plurality of receiver weighted taps;

the delay line, the weighted taps and the signal summer comprising an interdigitated acoustic surface wave device.

10. A receiver according to claim 9, wherein the tap weightings comprise groups of finger pairs, each pair in a specific group having the same weighting;

the receiver thereby being a band-pass receiver.

11. A receiver and transmitter according to claim 10, wherein some of the fingers of the finger pairs have segments which do not contribute to the weighting, but are nevertheless left on the substrate upon which all fingers are disposed.

* * * * *